("12") United States Patent
Wittmann

(10) Patent No.: US 11,981,270 B2
(45) Date of Patent: May 14, 2024

(54) VEHICLE STRIP DEVICE

(71) Applicant: MOTHERSON INNOVATIONS COMPANY LIMITED, London (GB)

(72) Inventor: Peter Wittmann, Coburg (DE)

(73) Assignee: MOTHERSON INNOVATIONS COMPANY LIMITED, London (GB)

( * ) Notice: Subject to any disclaimer, the term of this patent is extended or adjusted under 35 U.S.C. 154(b) by 396 days.

(21) Appl. No.: 17/326,790

(22) Filed: May 21, 2021

(65) Prior Publication Data

US 2021/0362662 A1    Nov. 25, 2021

(30) Foreign Application Priority Data

May 22, 2020    (DE) .......................... 102020206401.6

(51) Int. Cl.
*B60R 13/00*    (2006.01)
*B60J 10/265*   (2016.01)
*B60R 13/04*    (2006.01)

(52) U.S. Cl.
CPC ............. *B60R 13/04* (2013.01); *B60J 10/265* (2016.02)

(58) Field of Classification Search
CPC ....... B60R 13/04; B60R 13/043; B60R 9/058; B62D 25/07; B60J 10/265; B60J 10/27
See application file for complete search history.

(56) References Cited

U.S. PATENT DOCUMENTS

| | | | |
|---|---|---|---|
| 6,070,364 A * | 6/2000 | Berry ....................... | B60J 10/75 49/495.1 |
| 6,446,392 B1 * | 9/2002 | Maki ..................... | B60J 10/265 49/377 |
| 7,004,535 B1 | 2/2006 | Osterberg et al. | |
| 8,657,370 B1 * | 2/2014 | Pierce ..................... | B60R 13/06 296/213 |
| 9,649,994 B2 * | 5/2017 | Masuda ................... | B60J 10/16 |
| 10,071,522 B2 * | 9/2018 | Porter ..................... | B60R 13/04 |
| 11,104,211 B2 * | 8/2021 | Takahashi ............. | E05D 15/165 |
| 11,623,587 B2 * | 4/2023 | Johnston ................. | B60R 13/04 296/1.08 |
| 2007/0085361 A1 * | 4/2007 | Hauser .................... | B60R 13/04 296/1.08 |
| 2011/0204671 A1 * | 8/2011 | Baratin .................. | B60J 10/265 296/93 |

(Continued)

FOREIGN PATENT DOCUMENTS

| | | |
|---|---|---|
| DE | 20 2007 005 065 U1 | 6/2007 |
| DE | 10 2006 002 556 B3 | 8/2007 |

(Continued)

OTHER PUBLICATIONS

Office Action for German Patent Application No. 10 2020 206 401.6, dated Apr. 28, 2021, 14 pages.

*Primary Examiner* — Chi Q Nguyen

(74) *Attorney, Agent, or Firm* — Westman, Champlin & Koehler, P.A.

(57) ABSTRACT

A vehicle strip device, wherein the vehicle strip device is a functional and/or trim strip in a motor vehicle, wherein the vehicle strip device has a shell element and a fastening strip element, which are formed to have at least one fastening module and may be fastened to one another by the at least one fastening module, the shell element and the fastening strip element each being configured as a plastic injection-moulded part made of at least one plastic.

19 Claims, 11 Drawing Sheets

(56) References Cited

U.S. PATENT DOCUMENTS

2015/0123315 A1* 5/2015 Porter ................. B29C 48/0017
                                                      264/319
2017/0028939 A1* 2/2017 Takahashi ................. F16B 2/22
2020/0369138 A1* 11/2020 Murar .................... B60J 10/265
2022/0072754 A1* 3/2022 Brown .................... B29C 48/21

FOREIGN PATENT DOCUMENTS

| DE | 10 2008 028 599 A1 | 12/2009 |
| DE | 20 2013 104 713 U1 | 12/2013 |
| DE | 10 2012 017 864 A1 | 3/2014 |
| DE | 20 2013 000 888 U1 | 6/2014 |

* cited by examiner

A-A

B-B

C-C

D-D

VEHICLE STRIP DEVICE

CROSS-REFERENCE TO RELATED APPLICATION

This application claims priority to German Patent Application No. 10 2020 206 401.6, filed on May 22, 2020, the content of which is hereby incorporated by reference in its entirety.

FIELD OF THE INVENTION

The present invention relates to a vehicle strip device for a vehicle.

TECHNICAL BACKGROUND

From DE 10 2006 002 556 B3, a connecting element is known which has two connecting areas and a fastening area for connecting strips, and for fastening these strips to a body of a vehicle.

Furthermore, a fastening clip for fastening a roof strip to a roof duct of a vehicle is known from DE 20 2007 005 065 U1. The fastening clip has a very complex shape for fastening the roof strip.

Vehicle strips, such as water deflector strips, must be shaped appropriately depending on the type of vehicle and, if necessary, formed in such a way that they may be connected to an adjacent strip, in this case a roof strip.

SUMMARY OF THE INVENTION

In view of the above, there is the need to provide an improved vehicle strip device for a vehicle, in particular a vehicle strip device which allows simple adaptation to a desired shape.

According to the invention, this object is achieved by a vehicle strip device and/or by a vehicle having the features of the independent claims.

According to a first aspect, a vehicle strip device is provided, wherein the vehicle strip device is in particular a functional and/or trim strip in a motor vehicle, wherein the vehicle strip device has a shell element and a fastening strip element, which are formed to have at least one fastening module and may be fastened to one another by means of the at least one fastening module, wherein the shell element and the fastening strip element are each formed as a plastic injection moulding from at least one plastic material.

The vehicle strip device has the advantage that the shell element and the fastening strip element as injection-moulded parts, in contrast to extrusion parts, permit an almost free degree of shape and surface structure and may be very easily formed with the fastening module for fastening to one another, for example by sliding one inside the other, latching together and/or clamping together the shell element and fastening strip element by means of the common fastening module, etc. Thus, the vehicle strip device may be easily and inexpensively adapted to different types of vehicles, and all kinds of functional and/or trim strips may be implemented in a motor vehicle.

According to a second aspect, a vehicle is provided, in particular motor vehicle, with at least one vehicle strip device, wherein the vehicle strip device is in particular a water deflector strip which extends with its first longitudinal side along a windscreen of the vehicle and with its second longitudinal side along a side wall of the vehicle.

The present invention is based on the idea to provide a vehicle strip device which may be easily adapted to different specifications, in particular with regard to shape and surface structure, and which may furthermore be easily attached to a vehicle. To this end, the vehicle strip device has, on the one hand, the shell element which has the outer side and visible side of the vehicle strip device and, on the other hand, the fastening strip element for fastening the vehicle strip device to the vehicle and for—in addition and selectively—providing at least one functional section, e.g. a water deflector section, with which the fastening strip element is formed. Since the shell element and the fastening strip element are formed as plastic injection-moulded parts, this allows an almost free degree of shape and surface structure as well as the forming of the shell element and the fastening strip element with the at least one fastening module for fastening to each other without requiring additional separate fastening means such as clips, etc., as well as for forming the fastening strip element with at least selectively one additional functional section.

Advantageous configurations and further embodiments result from the dependent claims as well as from the description with reference to the Figures of the drawing.

In one embodiment according to the invention, the shell element and the fastening strip element are fastened to one another, in particular in a releasable fashion, by the at least one fastening module by latching, clamping and/or pushing together.

In a further embodiment according to the invention, the fastening strip element is formed to have at least one function section, for example a water deflector section, a lip, such as a sealing lip and/or rubber lip.

In one embodiment according to the invention, the fastening strip element is formed to have a connecting portion, the connecting portion being, for example, an end cap portion for connecting the vehicle strip device to a further vehicle strip, for example a roof strip.

In one embodiment according to the invention, the fastening strip element comprises a receptacle for receiving a longitudinal end of the shell element and for positioning the shell element relative to the fastening strip element.

In another embodiment according to the invention, the receptacle comprises an opening and the longitudinal end of the shell element comprises a projection, the projection being receivable in the opening for receiving the longitudinal end of the shell element and for positioning the shell element relative to the fastening strip element. For example, the projection is additionally clampable or engageable in the opening for additionally securing the shell element and the fastening strip element to each other.

In one embodiment according to the invention, the fastening module comprises a first fastening portion on a first longitudinal side of the shell element and the fastening strip element and a second fastening portion on a second, opposing longitudinal side of the shell element and the fastening strip element. The first fastening portion and the second fastening portion extend longitudinally along at least a partial length or along the entire length of the vehicle strip device. The first and second fastening portions of the fastening module overlap, for example, completely or partially in the longitudinal direction of the vehicle strip device.

In one embodiment according to the invention, the shell element and the fastening strip element are formed to have a first fastening module. The first fastening module comprises a first fastening portion on a first longitudinal side of the shell element and the fastening strip element, and a second fastening portion on a second, opposing longitudinal side of the shell element and the fastening strip element. The first fastening portion is formed to have an undercut, e.g. in the form of a hook-shaped section, of the shell element and a clamping section of the fastening strip element, the clamping section being engaged at the undercut or embraced by the latter in the assembled state of the vehicle strip device. The second fastening portion is formed to have a projection on the underside of the shell element and a receptacle of the fastening element corresponding to the projection, for receiving and in addition and selectively clamping the projection in the assembled state of the vehicle strip device.

In a further embodiment according to the invention, the shell element and the fastening strip element are formed to have a second fastening module. The second fastening module comprises a first fastening portion on a first longitudinal side of the shell element and the fastening strip element, and a second fastening portion on a second, opposing longitudinal side of the shell element and the fastening strip element. The first fastening portion is formed to have a positioning projection on the underside of the shell element and an associated region of the outer edge of the fastening strip element for positioning the shell element with its projection relative to the fastening strip element in the assembled state of the vehicle strip device, wherein, for example, a gap is additionally provided between the outer edge of the fastening strip element and the opposing inner edge of the positioning projection of the shell element. The second fastening portion is formed to have a latching element on the underside of the shell element and a receptacle of the fastening strip element corresponding to the latching element, for receiving and latching the latching element in the assembled state of the vehicle strip device, the receptacle having, for example, an opening for latching the latching element.

In one embodiment according to the invention, the shell element and the fastening strip element are formed to have a third fastening module. The third fastening module comprises a first fastening portion on a first longitudinal side of the shell element and the fastening strip element and a second fastening portion on a second, opposing longitudinal side of the shell element and the fastening strip element. The first fastening portion is formed to have a projection having an undercut, e.g. in the form of a hook-shaped section, of the shell element and a clamping section of the fastening strip element, wherein the clamping section is engaged or embraced by the projection with the undercut in the mounted state of the vehicle strip device. The second fastening portion is formed to have a positioning projection on the underside of the shell element and a region of the outer edge of the fastening strip element associated to the positioning projection, for positioning the shell element with its positioning projection relative to the fastening strip element in the mounted state of the vehicle strip device, wherein, for example, a gap is additionally provided between the outer edge of the fastening strip element and the opposing inner edge of the positioning projection of the shell element. The associated region of the outer edge in addition and selectively has a stepped portion, on the upper side of which, opposing the shell element, a functional section is formed, for example in the form of a lip, e.g. a rubber or sealing lip.

In a further embodiment according to the invention, the first and second fastening portions of at least one fastening module are provided opposing one another on the longitudinal sides of the shell element and of the fastening element, the first and second fastening portions overlapping one another at least partially or completely.

In another embodiment according to the invention, the fastening strip device is configured to have at least one receptacle, in particular an opening, for receiving and fastening, for example clipping or latching, a clamping device. The clamping device serves to connect the vehicle strip device to the associated vehicle and preferably additionally to fasten the vehicle strip device to the vehicle body of the associated vehicle, for example by clipping or latching onto the vehicle body.

In one embodiment according to the invention, the shell element and/or the fastening strip element is/are formed as a single-component injection-moulded part or multi-component injection-moulded part, in particular two-component or three-component injection-moulded part.

The above embodiments and further embodiments may be combined with one another as desired, if this makes sense. Further possible embodiments, further configurations and implementations of the invention also include combinations of features of the invention described above or below with respect to the exemplary embodiments that are not explicitly mentioned. In particular, the person skilled in the art will also add single aspects as improvements or additions to the respective basic form of the present invention.

BRIEF DESCRIPTION OF THE DRAWINGS

The present invention is explained in more detail below with reference to the exemplary embodiments illustrated in the schematic Figures of the drawings, wherein.

Figure 1:
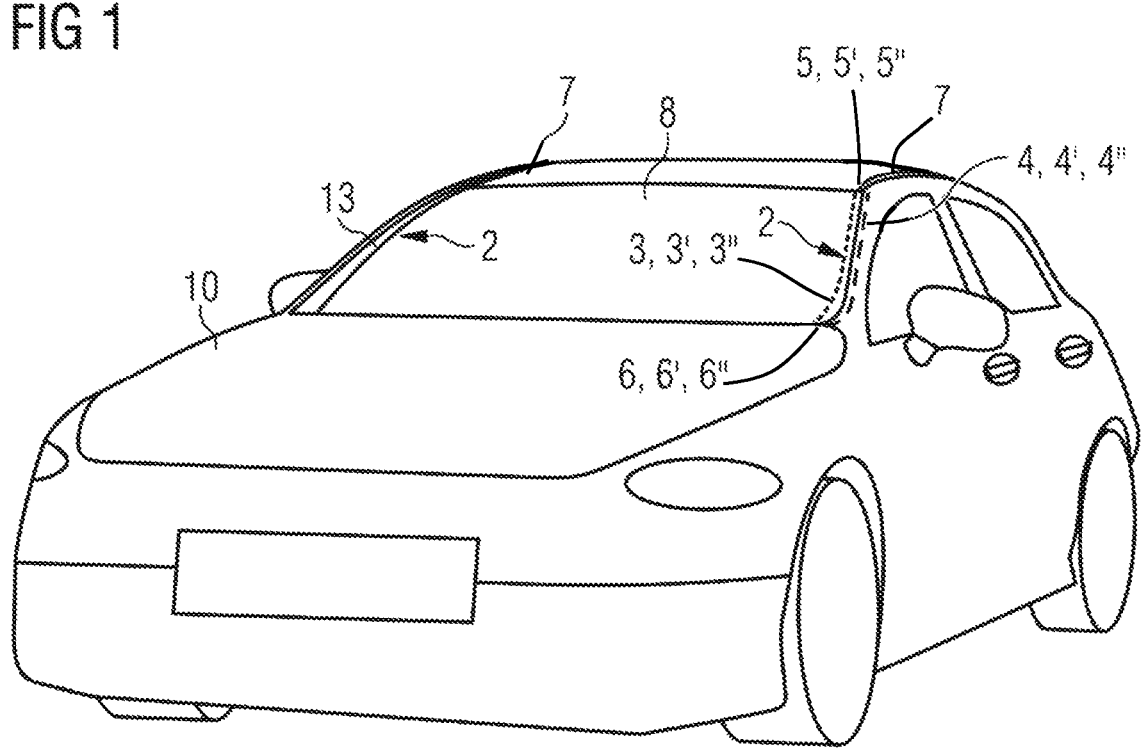
FIG. 1 is a front view of a vehicle having a respective vehicle strip device according to the invention in the form of a roof strip.

The accompanying drawings are intended to provide a further understanding of embodiments of the invention. They illustrate embodiments and, in connection with the description, serve to explain principles and concepts of the invention. Other embodiments and many of the advantages mentioned will be apparent with reference to the drawings. The elements of the drawings are not necessarily drawn to scale with respect to each other.

In the Figures of the drawing, the same elements, features and components, which have the same function and act in the same way, are each indicated by the same reference signs, unless otherwise stated.

DESCRIPTION OF EXEMPLARY EMBODIMENTS

FIG. 1 shows a perspective front view of a vehicle 1, wherein the vehicle 1 comprises a respective vehicle strip device 2 according to the invention. The vehicle strip device 2 has a first longitudinal side 3 and a second longitudinal side 4, as well as a first longitudinal end 5 and a second longitudinal end 6.

In the exemplary embodiment of the vehicle strip device 2 according to the invention shown in FIG. 1 and the subsequent FIGS. 2 to 15, the vehicle strip device 2 is configured, for example, as a water deflector strip which is connected to an associated roof strip 7. The water deflector strip serves to prevent, for example, as far as possible, water from spilling onto the side windows and the two mirrors during operation of the windscreen washer system. The vehicle strip device 2 according to the invention, which is described with reference to the attached FIGS. 1 to 15 using the example of a water deflector strip, is not, however, limited to water deflector strips on vehicles, in particular motor vehicles, but may also be configured as any other functional and/or decorative trim strip on a vehicle and in particular motor vehicle.

In the water deflector strip as an example of the vehicle strip device 2 according to the invention, the first longitudinal side 3 is arranged adjacent to the windshield 8, and the second longitudinal side 4 is arranged adjacent to the vehicle body, in this case the side wall 9 or A-pillar. The first longitudinal end 5 of the water deflector strip is in turn arranged opposing the associated roof strip 7 and the second longitudinal end 6 opposing the engine hood (and the water reservoir cover) 10 in the example of a motor vehicle shown in FIG. 1.

Figure 2:
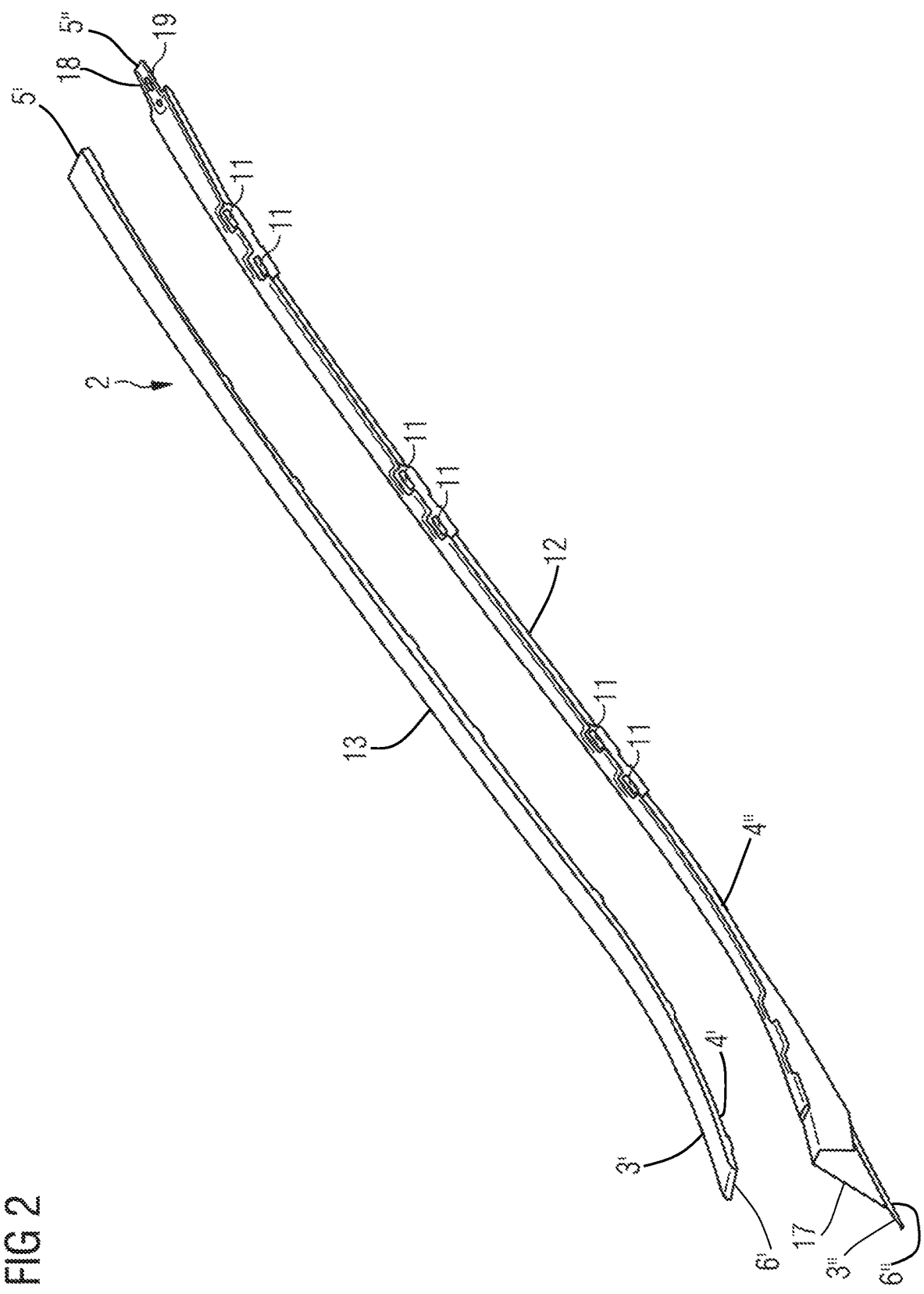
FIG. 2 is a perspective view of a vehicle strip device according to one embodiment of the invention, wherein the vehicle strip device is shown before assembly.

FIG. 2 shows a perspective view of the vehicle strip device 2 according to one embodiment of the invention, wherein the vehicle strip device 2 is shown before assembly. Here, the first and second longitudinal sides 3, 4, as well as the first and second longitudinal ends 5, 6 of the vehicle strip device 2 are shown. FIG. 2 also shows the openings 11 in the fastening strip element 12 of the vehicle strip device 2 for fastening the fastening strip element 12 and thus the vehicle strip device 2 according to the invention to the vehicle body.

Figure 3:
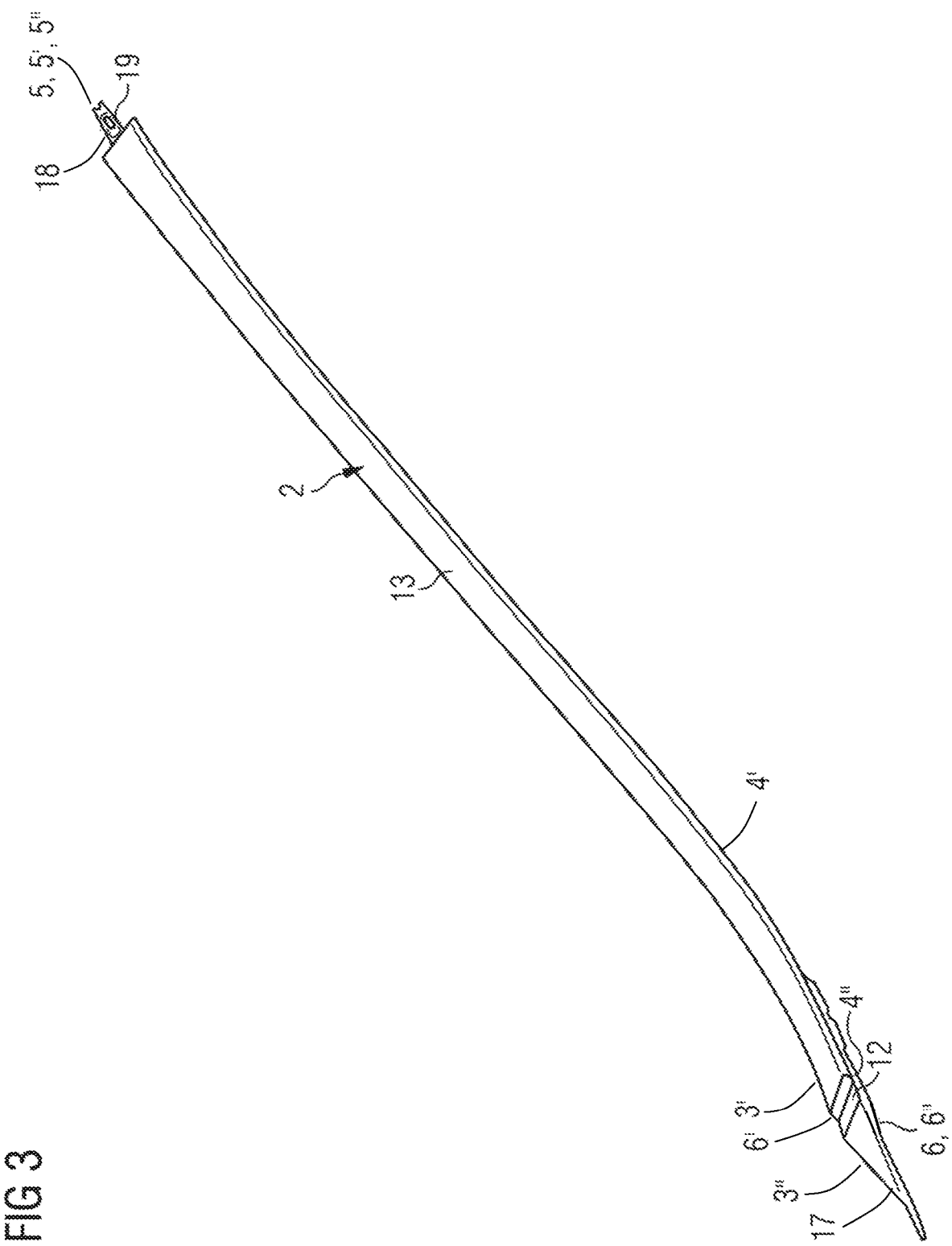
FIG. 3 is a perspective view of the vehicle strip device of FIG. 2 in a fully assembled state.
Figure 4:
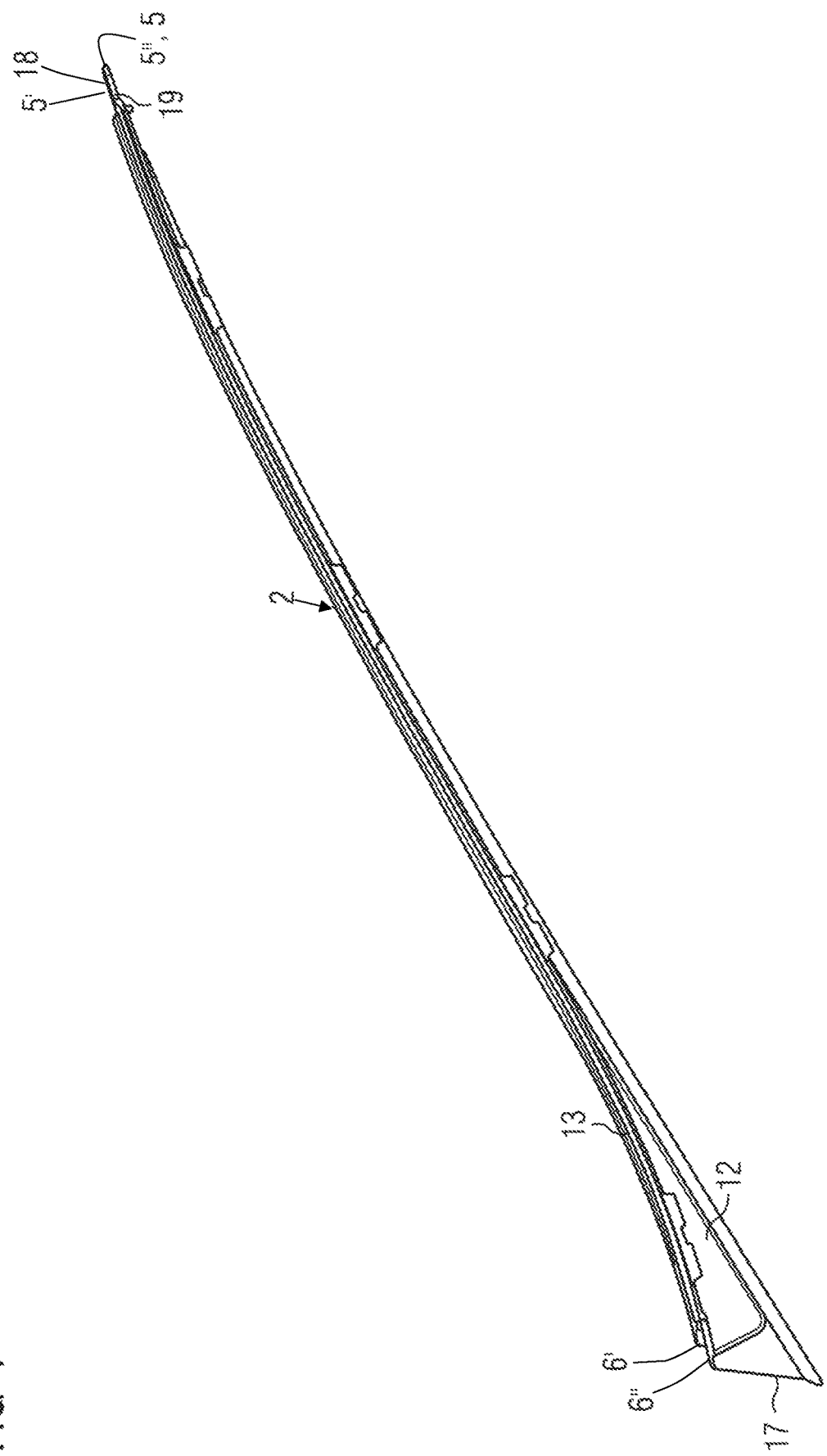
FIG. 4 is a perspective view of the vehicle strip device of FIG. 3.
Figure 5:
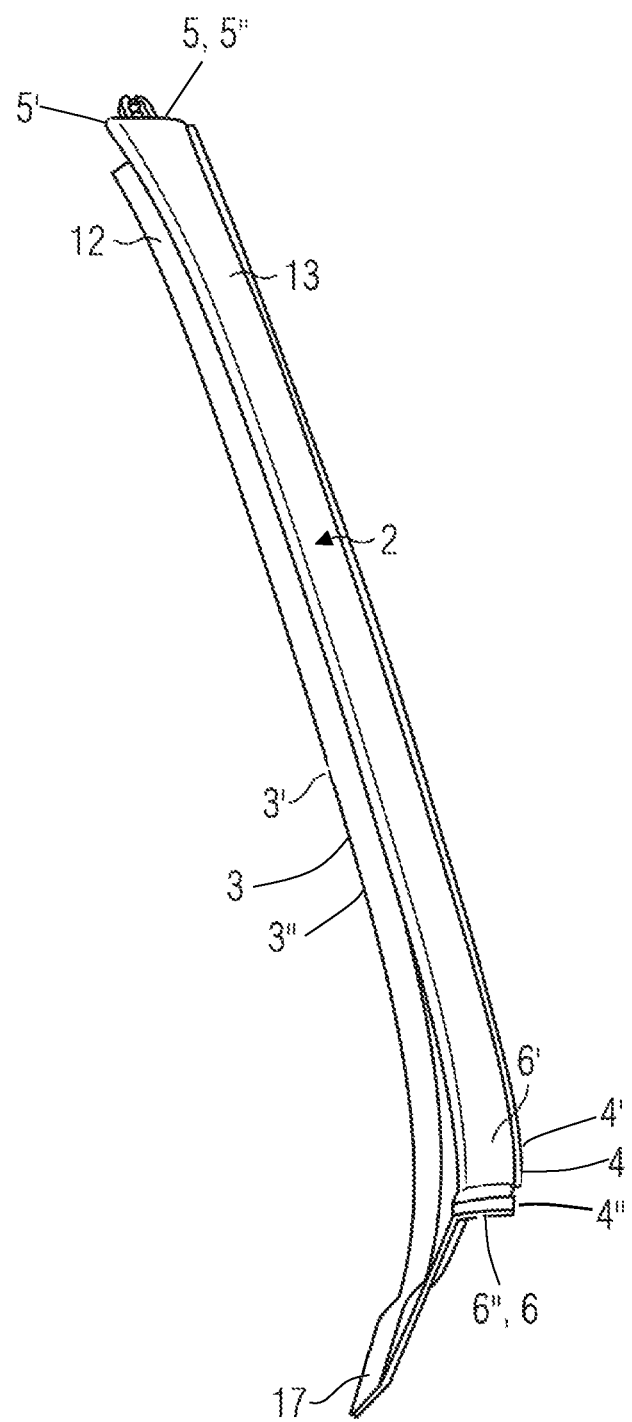
FIG. 5 is a further perspective view of the vehicle strip device of FIG. 3.

FIG. 3 shows a perspective view of the vehicle strip device 2 of FIGS. 1 and 2, with the vehicle strip device 2 shown in the mounted state i.e. fully assembled.

FIGS. 4, 5, 6 and 7 show further views of the vehicle strip device 2 according to FIGS. 1, 2 and 3 from different perspectives.

FIG. 2 shows for example that the vehicle strip device 2 comprises a shell element 13 and the fastening strip element 12. The vehicle strip device 2 and, more precisely, its shell element 13 and fastening strip element 12 extend in the longitudinal direction, and extend, as a water deflector strip, laterally along the windshield 8 between the roof and the engine hood (and water reservoir cover) 10.

The shell element 13 and the fastening strip element 12 each have a first and second longitudinal side 3', 3"; 4', 4" and a first and second longitudinal end 5',5"; 6', 6" corresponding to the first and second longitudinal side 3, 4 and the first and second longitudinal end 5, 6 of the vehicle strip device 2 in the assembled state.

The shell element 13 is thereby attached with its inner side to the outer side of the fastening strip element 12. The outer side of the shell element 13 forms the visible side of the shell element 13, in particular when the shell element 13 is attached to the vehicle 1 as part of the vehicle strip device 2, as shown in FIG. 1.

The fastening strip element 12 and the shell element 13 are formed in such a way that they may be fastened to one another. To this end, the vehicle strip device 2 has one or more fastening modules 14, 15, 16 with first and second fastening portions for fastening the fastening strip element 12 and the shell element 13 to one another, as will be described in more detail below, in particular also with reference to FIGS. 6 to 15.

Since the vehicle strip device 2 in the exemplary embodiment shown in FIGS. 1 to 15 is provided as a water deflector strip, the fastening strip element 12 in the exemplary embodiment shown in FIGS. 1 to 15 is in addition and selectively formed to have at least one first functional section, in this case a water deflector section 17. In this case, the water deflector section 17 is provided on the first longitudinal side 3" of the fastening strip element 12 and, in the assembled state, extends along the windshield 8, as previously shown in FIG. 1.

The water deflector section 17 is shaped to prevent water from passing from the windshield 8 to the side windows and the two mirrors during operation of the windshield washer system when traveling along the road. Instead, the water deflector section 17 directs the water upward toward the vehicle roof and roof strips 7, from where it may be removed by the airstream.

For fastening the shell element 13 to the fastening strip element 12, the shell element 13 and the fastening strip element 12 are configured such that they may be latched, clamped and/or inserted into one another, for example, at their fastening modules 14, 15, 16, as will be explained in more detail below with reference to FIGS. 6 to 15. To this end, the vehicle strip device 2 has, as previously explained, one or more fastening modules 14, 15, 16 for fastening the shell element 13 and the fastening strip element 12 to one another. Examples of the fastening modules 14, 15, 16 and their first and second fastening portions on the first and second longitudinal sides 3', 4'; 3", 4" of the shell element 13 and the fastening strip element 12 are described in more detail below with reference to FIGS. 6 to 15.

Furthermore, in the exemplary embodiment shown in FIGS. 1 to 15, the fastening strip element 12 as a water deflector strip has in addition and selectively a connecting portion 18 at one longitudinal end, in this case the first longitudinal end 5", for connecting the water deflector strip to the associated roof strip 7, and optionally for additionally fastening the water deflector strip to the roof strip 7, e.g. by plugging together, pushing together, clamping together and/or latching together, etc. In the exemplary embodiment in FIGS. 1 to 15, the connecting portion 18 at the first longitudinal end 5" of the fastening strip element 12 is formed as an end cap portion 19 for a transition and optional additional connection to the roof strip 7, which in this case is a roof strip 7 of larger width. The connecting portion 18, in this case end cap portion 19, is formed in one piece or integrally with the rest of the fastening strip element 12. In other words, the fastening strip element 12 is manufactured with its connecting portion 18 as an injection-moulded part. The end cap portion 19 as the connecting portion 18 may thereby be formed in such a way that it may be connected to the roof strip 7, and, in particular, the end cap portion 19 and the roof strip 7 may be additionally fastened to one another, for example by plugging together, pushing together, clamping and/or latching together, and the like.

As previously explained, the fastening strip element 12 optionally has at least one first functional section, in this case, for example, water deflector section 17. However, depending on the function and intended use, any other functional section may be provided on the fastening strip element 12, depending on the vehicle strip device 2.

The fastening strip element 12 is formed, for example, as a multi-component injection-moulded part, for example as at least a two-component (2K) injection-moulded part. However, it may also be configured only as a single-component (1K) injection-moulded part, depending on the function and intended use.

In this case, the at least one optional, first functional section in the form of a water deflector section 17 is made, for example, from a soft or elastic plastic material or combination of plastic materials, for example from at least one elastomer. Depending on the function and intended use, however, the functional section may be made equally firm and, if necessary, hard or rigid instead of soft or elastic, and may in principle be made of any other plastic material or combination of plastic materials, for example of at least one thermoset and/or at least one thermoplastic, etc.

For instance, the remaining fastening strip element 12 with its at least one fastening module 14, 15, 16 and in addition and selectively at least one connecting portion 18 is, in the exemplary embodiment shown in FIGS. 1 to 15, not soft or elastic but is made of, for example, a solid or hard plastic material or combination of plastic materials, e.g. of at least one thermoplastic and/or of at least one thermoset. However, the invention is not limited to the examples of plastic materials and combinations of plastic materials. Any plastic material or combination of plastic materials may be provided for the fastening strip element 12, the functional sections 17 thereof, the at least one fastening module 14, 15 16 thereof and/or the at least one connecting portion 18 thereof, etc., depending on the function and intended use.

The plastic material or the combination of at least two plastic materials from which the at least one functional section is made and/or the plastic material or the combination of at least two plastic materials from which, for example, the remaining fastening strip element 12 with its at least one fastening module 14, 15, 16 and optionally at least one connecting portion 18 is made, may or may in addition and selectively have at least one additive and/or at least one filler added. For example, fibers, such as glass fibers, etc., may be used as a filler to provide a fiber-reinforced injection-moulded plastic part as a fastening strip element 12.

In the exemplary embodiment shown in FIGS. 1 to 15, the shell element 13 is formed as the outer shell, in this case the outer shell of the water deflector strip. However, the invention is not limited to the outer shell of a water deflector strip of a vehicle 1. Instead, the shell element 13 may be formed as any type of shell element for a vehicle strip device 2 and the fastening strip element 12 thereof on a vehicle 1, in particular a motor vehicle. In addition to a water deflector strip, the vehicle strip device 2 according to the invention may also be configured as a roof strip, as a vehicle strip and in particular as a decorative strip of the vehicle door, the A, B, C or D pillar, the vehicle rear, the vehicle front, the vehicle mudguard, the vehicle rear fender, the vehicle headlight bezel or the vehicle window bezel, etc., depending on the function and intended use of the vehicle strip device 2.

In this case, the shell element 13 is also formed as an injection-moulded part and preferably as a single-component (1K) injection-moulded part. Also, at least one additive and/or at least one filler may optionally be added to the plastic material or the combination of at least two plastic materials of the injection-moulded part. For example, fibers, such as glass fibers, etc., may be used as a filler to provide a fiber-reinforced plastic injection moulded part as shell element 13. The shell element 13 and the reinforcing strip element 12 as plastic injection-moulded parts have the advantage with respect to, for example, extrusion parts in that injection molding provides an almost free degree of shape and surface structure, including, for example, smooth or glossy surfaces, graining, patterns, engravings, color defects, etc. Instead of being a single-component (1K) plastic injection moulded part, the shell element 13 may also be a multi-component plastic injection moulded part, e.g. a two- or three-component plastic injection moulded part. Conversely, the fastening strip element 12 may be formed as a single-component (1K) plastic injection-moulded part as well as a multi-component plastic injection-moulded part, e.g. as a three-component plastic injection-moulded part, etc., as previously explained, depending on whether, for example, the at least one functional section 17, the at least one fastening module 14, 15, 16, the at least one connecting portion 18 and/or the remaining fastening strip element 12 are made from the same plastic material or from the same combination of plastic materials or from different plastic materials or from different combinations of plastic materials.

Furthermore, the shell element 13 of the vehicle strip device 2 according to the invention is manufactured to have, for example, a glossy surface, in particular at least on the visible side of the shell element 13. The visible side of the shell element 13 is located on the outer side of the shell element 13. In the mounted state of the vehicle strip device 2 on the vehicle 1, the outer side and correspondingly the visible side of the shell element 13 is located on the outer side of the vehicle 1, as shown in FIG. 1.

In order to achieve the glossy surface at least in the visible area of the shell element 13, the plastic injection-moulded part is coated and/or painted with a suitably glossy, in particular high-gloss film or a suitable film system, etc. For example, polymethylmethacrylate (PMMA) and/or polycarbonate (PC) may be used as the plastic material for manufacturing the shell element 13. However, the invention is not limited to the aforementioned plastic materials or combination of plastic materials.

Furthermore, the invention is not limited to manufacturing the shell element 13 with a glossy surface at least on the visible side thereof. Depending on the function and intended use, the shell element 13 may also have a different surface or combination of different surface areas, including at least one matt and/or structured surface area, for example a matt and/or structured surface, for example at least on the visible side of the shell element 13, depending on the function and intended use of the vehicle strip device 2.

Depending on the function and intended use, the fastening strip element 12 may also have at least one surface area which has a glossy surface, in particular high-gloss, matt and/or structured surface, for example.

Figure 6:
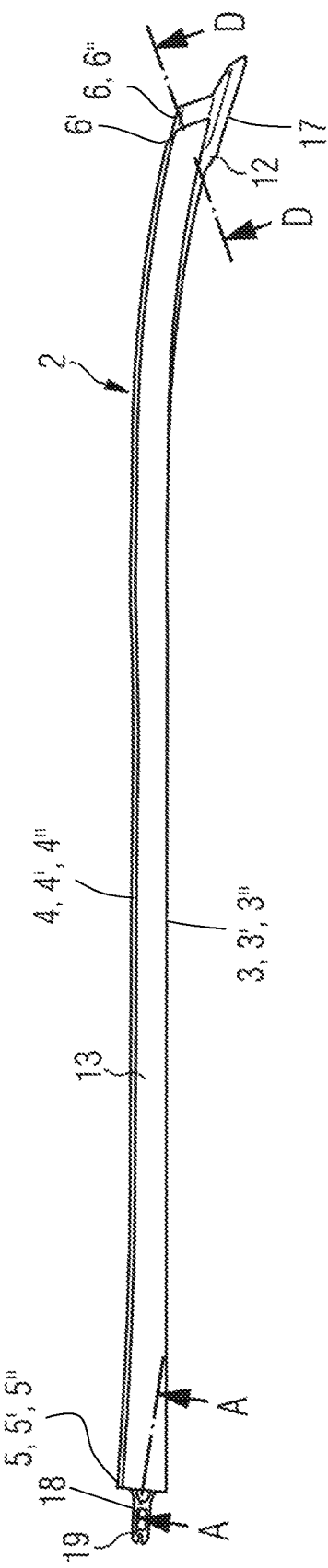
FIG. 6 is another perspective view of the vehicle strip device of FIG. 3.
Figure 7:
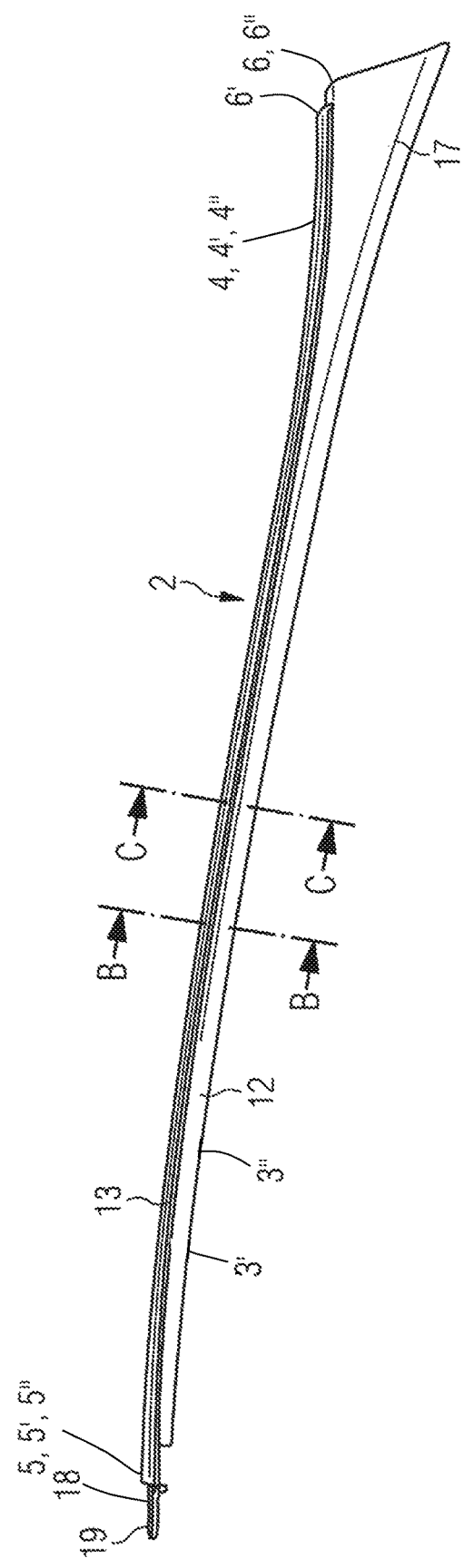
FIG. 7 is another perspective view of the vehicle strip device of FIG. 3.

FIG. 6 shows a perspective side view of the vehicle strip device 2, and FIG. 7 shows a top view of the vehicle strip device 2. In particular, the shell element 13 and the fastening strip element 12 are shown with the connecting portion 18 thereof, in this case end cap portion 19 at the first longitudinal end 5" thereof.

For explanation of the connection of the shell element 13 and the fastening strip element 12, various sectional views of the vehicle strip device 2 are shown in FIGS. 8 to 15.

Figure 8:
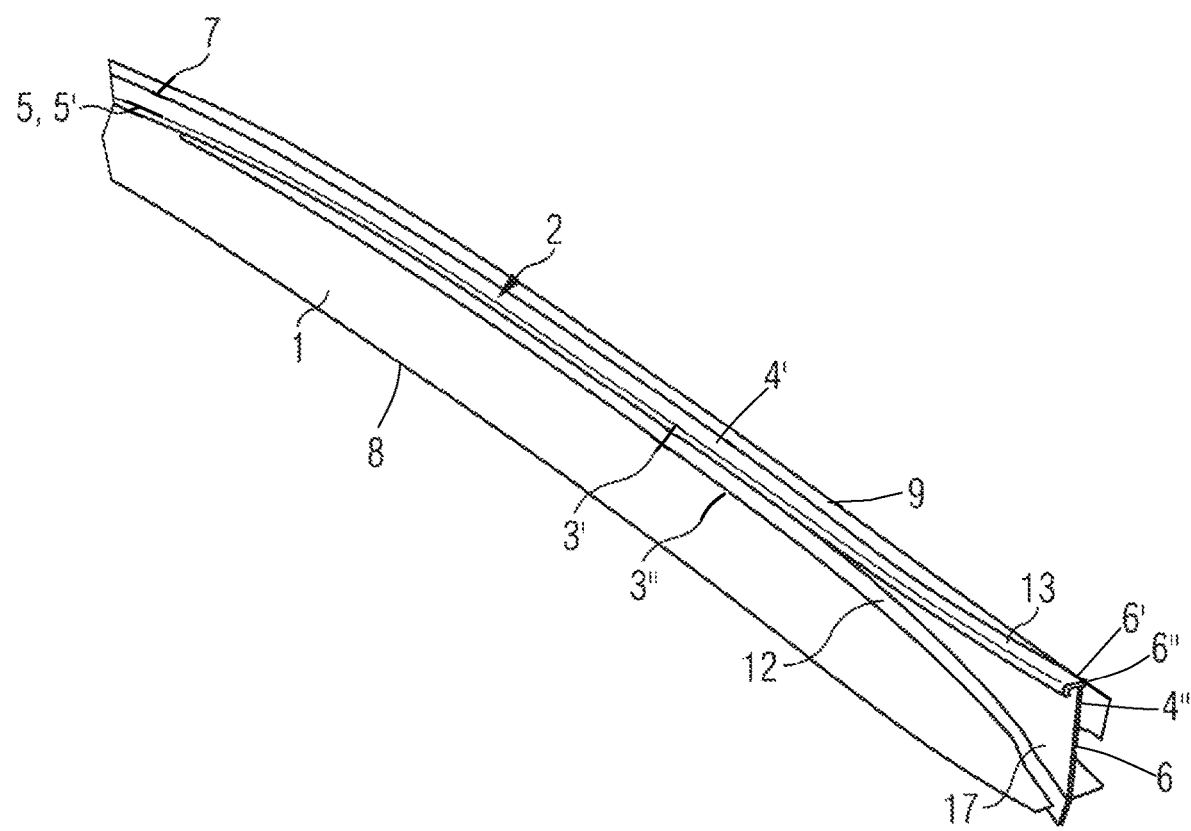
FIG. 8 is a perspective view of the vehicle strip device of FIG. 3, with the vehicle strip device being attached to the windshield, vehicle side wall and roof strip.

FIG. 8 shows, first of all, a perspective view of the vehicle strip device 2 as shown in FIG. 3 and, in particular, FIG. 8 shows the connection of the vehicle strip device 2 as a water deflector strip connected to the windshield 8, to the vehicle body, in this case to the vehicle side wall 9, and to the roof strip 7.

Figure 9:
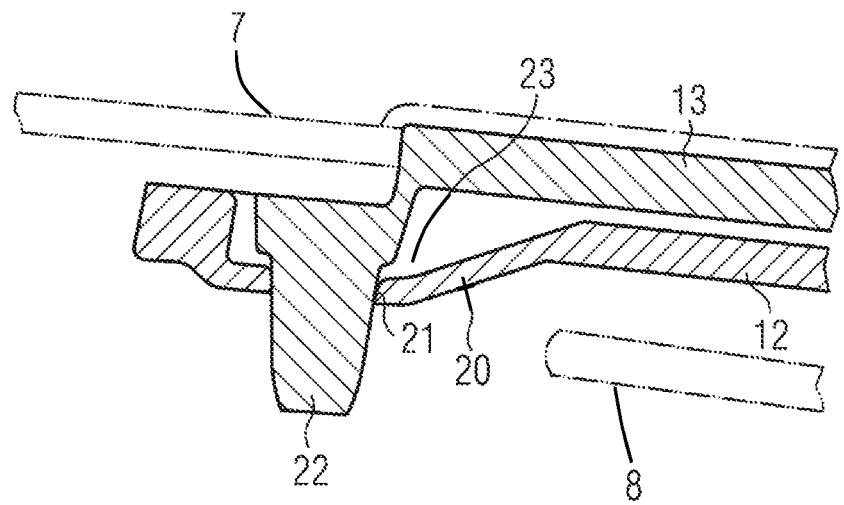
FIG. 9 is a sectional view of the vehicle strip device of FIG. 6 along direction A-A, in the region of the end cap portion.
Figure 10:
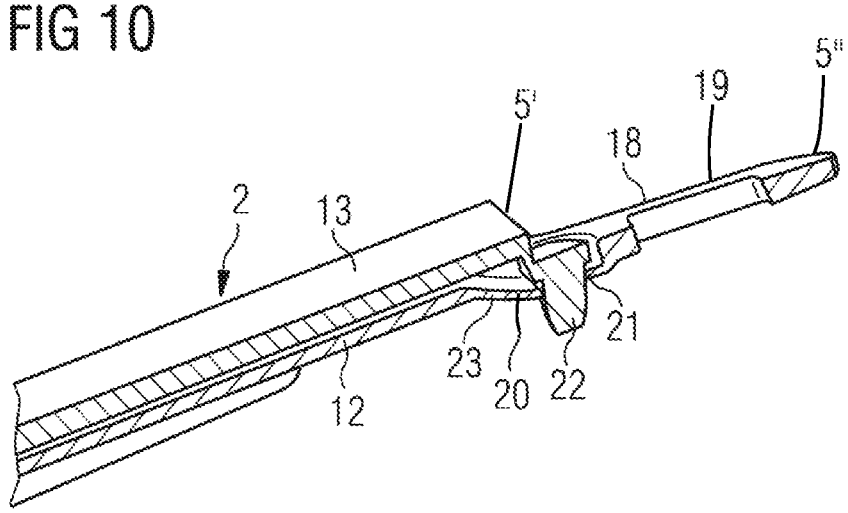
FIG. 10 is a perspective view of a section of the vehicle strip device of FIG. 9 in the region of the end cap portion.

FIG. 9 shows a sectional view along direction A-A in the region of the connection section 18 of the vehicle strip device 2 as shown in FIG. 6, and FIG. 10 shows a section of the vehicle strip device 2 in the region of the connection section 18 as a longitudinal section. In the exemplary embodiment in FIGS. 1 to 15, the connecting portion 18 is located at the first longitudinal end 5 of the vehicle strip device 2.

For positioning and in addition and selectively for fastening the shell element 13 at its first longitudinal end 5", the fastening strip element 12 has a receptacle 20 which is configured to receive the first longitudinal end 5' of the shell element 13 and to position the first longitudinal end 5' opposing the first longitudinal end 5" of the fastening strip element 12 and in addition and selectively to fasten the first longitudinal end 5' thereto.

To this end, the receptacle 20 has, for example, an opening 21, in which a projection 22 of the longitudinal end 5' of the shell element 13, corresponding to the opening 21, may be received and in addition may be selectively clamped and/or latched, for example. The projection 22 is configured, for example, as a stud, and the opening 21 is configured as a bore, in which the stud may be accommodated in a form-fitting manner and in addition may be received by clamping and/or latching. Furthermore, the receptacle 20 may be configured as a recess 23 with the opening 21 arranged in the recess 23, as shown by way of example in FIGS. 9 and 10.

The combination of the receptacle 20 and the projection 22 has the advantage that the shell element 13 may be positioned with its one longitudinal end 5' relative to the fastening strip element 12, and thus is not unintentionally displaceable in the longitudinal and transverse directions relative to the fastening strip element 12. This also simplifies the assembly of shell element and fastening strip element and prevents an incorrect assembly. In particular, it is prevented that the first longitudinal end 5' of the shell element 13 are connected to the second longitudinal end 6" of the fastening strip element 12 and vice versa.

In the example shown in FIGS. 9 and 10, the first longitudinal end 5' of the shell element 13 is formed to have steps on its outer side in such a way that the shell element 13 with its stepped longitudinal end 5' is aligned with the upper side of the receptacle 20 in the assembled state, so that, for example, a subsequent strip, in this case for example the roof strip 7, may be arranged above the receptacle 20 and the stepped longitudinal end 5' and is aligned with the outer side and visible side of the shell element 13, for example. The end cap portion 19 of the fastening strip element 12 is thereby also arranged below the roof strip 7 and may not only be inserted into the roof strip 7 underneath the roof strip 7, but may—in addition—selectively be fastened to the roof strip 7, for example by clamping and/or latching to the underside of the roof strip 7.

As described above, the end cap portion 19 serves as a transition to another strip, here e.g. the roof strip 7. In FIG. 9 the roof strip 7 is indicated by a double-dashed line.

Figure 11:
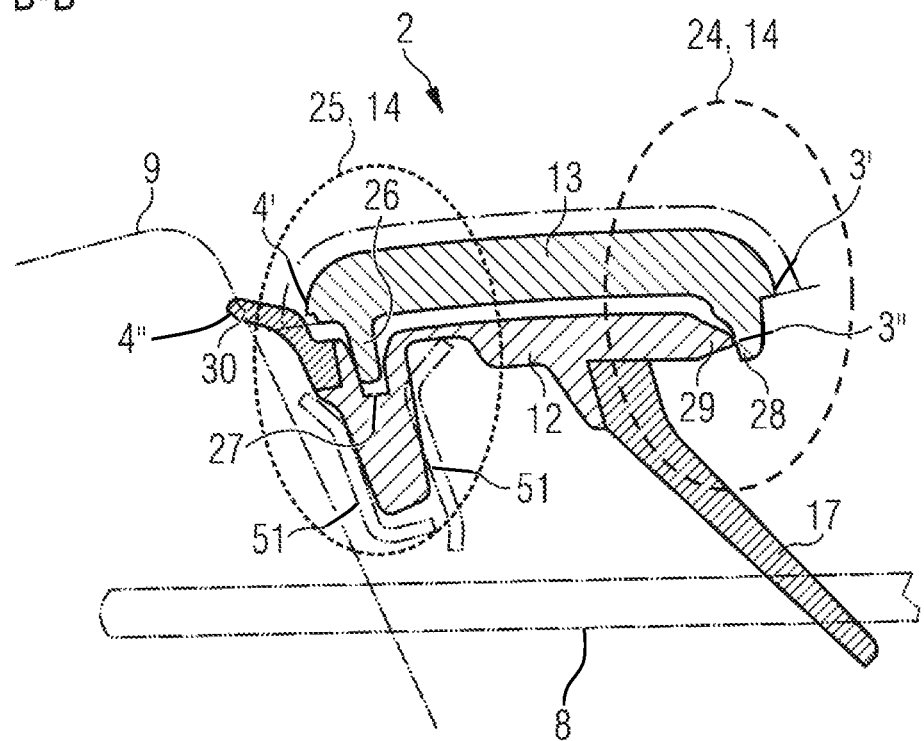
FIG. 11 is a sectional view of the vehicle strip device of FIG. 7 along direction B-B.

FIG. 11 shows a sectional view of the vehicle strip device 2 of FIG. 7 along direction B-B. Here, the first fastening module 14 of the fastening strip element 12 and the shell element 13 is shown.

The fastening module, in this case the first fastening module 14, is composed of a first fastening portion 24 on the first longitudinal side 3', 3" of the shell element 13 and of the fastening strip element 12, and a second fastening portion 25 on the second longitudinal side 4', 4" of the shell element 13 and of the fastening strip element 12. This applies to all fastening modules, including the second and third fastening modules 15 and 16, which will be discussed below.

The first and second fastening portions 24, 25 of the fastening module, in this case e.g. first fastening module 14, may be provided opposing one another in the longitudinal direction of the vehicle strip device 2 or offset with respect to one another in the longitudinal direction, wherein in the case of an offset arrangement with respect to one another the first and second fastening portions 24, 25 may overlap one another in the longitudinal direction of the vehicle strip device 2, or alternatively may not overlap one another.

In order to provide the second fastening portion 25 of shell element 13 and fastening strip element 12, the shell element 13 has a projection 26, for example a pin or stud or rib, etc., on the underside on its second longitudinal side 4'. The fastening strip element 12 in turn has on its second longitudinal side 4" a receptacle 27 corresponding to the projection 26 of the shell element 13, here in the form of a recess or opening (not shown), in which the projection 26 of the shell element 13 may be received and clamped.

In order to clamp the projection 26 in the receptacle 27, the shell element 13 has, as a first fastening portion 24, an undercut 28 on its first longitudinal side 3', for example in the form of a hook-shaped section. The hook-shaped section is formed and extends downwardly away from the underside of the shell element 13 in such a way that it may clasp around an associated clamping section 29 on the first longitudinal side 3" of the fastening strip element 12 or engage on this clamping section 29 of the first longitudinal side 3". By clasping around or engaging, the shell element 13 is thereby clamped with its projection 26 into the receptacle 27 of the fastening strip element on the second longitudinal side 4' or 4" at the same time. In the first fastening portion 24, the clamping section 29 on the first longitudinal side 3" of the fastening strip element 12 is additionally configured to taper outwardly in the transverse direction or to be pointed, for example, as shown in FIG. 11, for easier engaging or clasping by the corresponding undercut 28 of the shell element 13.

FIG. 11 also shows the first functional section of the vehicle strip device formed on the first longitudinal side 3" of the fastening strip element 12, in this case the water deflector section 17, which is configured to deflect water, in particular when the wiper system is operated, upwards or towards the first longitudinal end 5 of the vehicle strip device 2, and thus towards the roof and away from the side windows and mirrors of the vehicle.

The fastening strip element 12 has a further second functional section, for example in the form of a lip 30, for example a rubber lip. The second functional section is configured as a transition section of the vehicle strip device 2 and in particular of the fastening strip element 12 thereof to the vehicle body, here vehicle side wall 9 or A-pillar shown in FIG. 1. The first and second functional sections, here the water deflector section 18 and the lip 30, may both be made of the same plastic material or the same combination of plastic materials, e.g. an elastomer, or of different plastic materials or different combination of plastic materials, depending on the function and intended use of the respective functional section.

Figure 12:
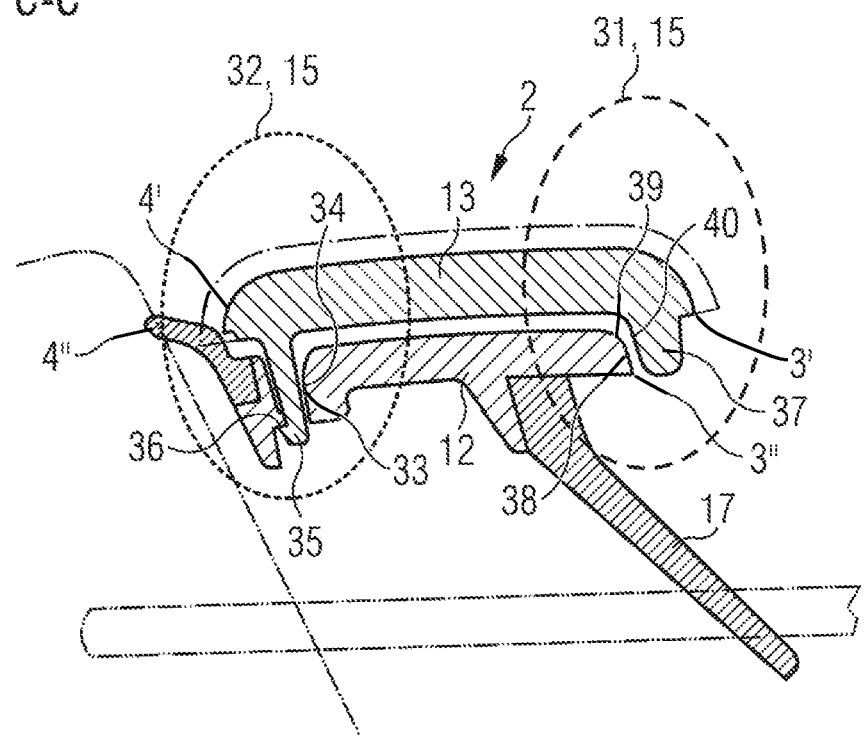
FIG. 12 is a sectional view of the vehicle strip device of FIG. 7 along direction C-C.
Figure 13:
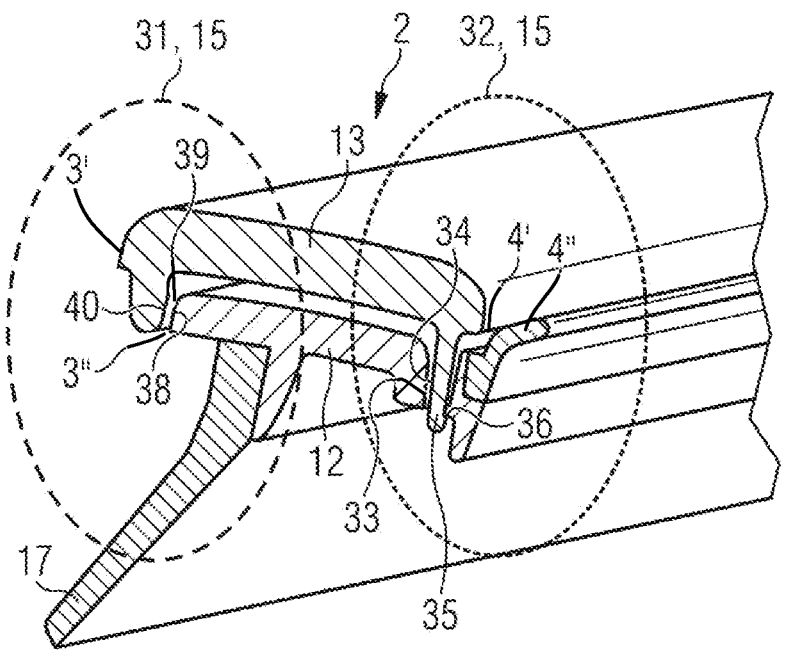
FIG. 13 is a perspective view of the vehicle strip device of FIG. 7 of the section along direction C-C.

FIG. 12 shows a sectional view of the vehicle strip device 2 of FIG. 7 along direction C-C, and FIG. 13 shows a sectional perspective view of the vehicle strip device 2 of FIG. 7 along direction C-C.

FIGS. 12 and 13 show the second fastening module 15 of the fastening strip element 12 and the shell element 13, respectively. As previously explained, the second fastening module 15 comprises a first fastening portion 31 on the first longitudinal side 3', 3" of the shell element 13 and the fastening strip element 12, and a second fastening portion 32 on the second longitudinal side 4', 4" of the shell element 13 and the fastening strip element 12.

To provide the second fastening portion 32 of shell element 13 and fastening strip element 12, the fastening strip element 12 has on its second longitudinal side 4" a receptacle 33 with an opening 34, in which a latching element 35, which is formed on the second longitudinal side 4' of the shell element 13 on its underside, is received and latched. The opening 34 is formed, for example, as a through-opening, wherein the opening 34 or, in this case, the through-opening optionally has an additional undercut 36 on which the latching element 35 may be latched. The latching element 35 is configured, for example, as an engagement hook.

To provide the first fastening portion 31 of shell element 13 and fastening strip element 12, the shell element 13 has a downwardly extending positioning projection 37 on its first longitudinal side 3' for positioning the shell element 13 on the fastening strip element 12. In the exemplary embodiment shown in FIGS. 12 and 13, this positioning projection 37 does not abut against the outer edge 38 of the fastening strip element 12 on its first longitudinal side 3". Instead, a gap 39 is arranged between the outer edge 38 of the fastening strip element 12 and the opposing inner edge 40 of the projection of the shell element 13. This gap 39 has the advantage that, if necessary, manufacturing and assembly tolerances may be compensated. In principle, however, a gap does not have to be provided.

Figure 14:
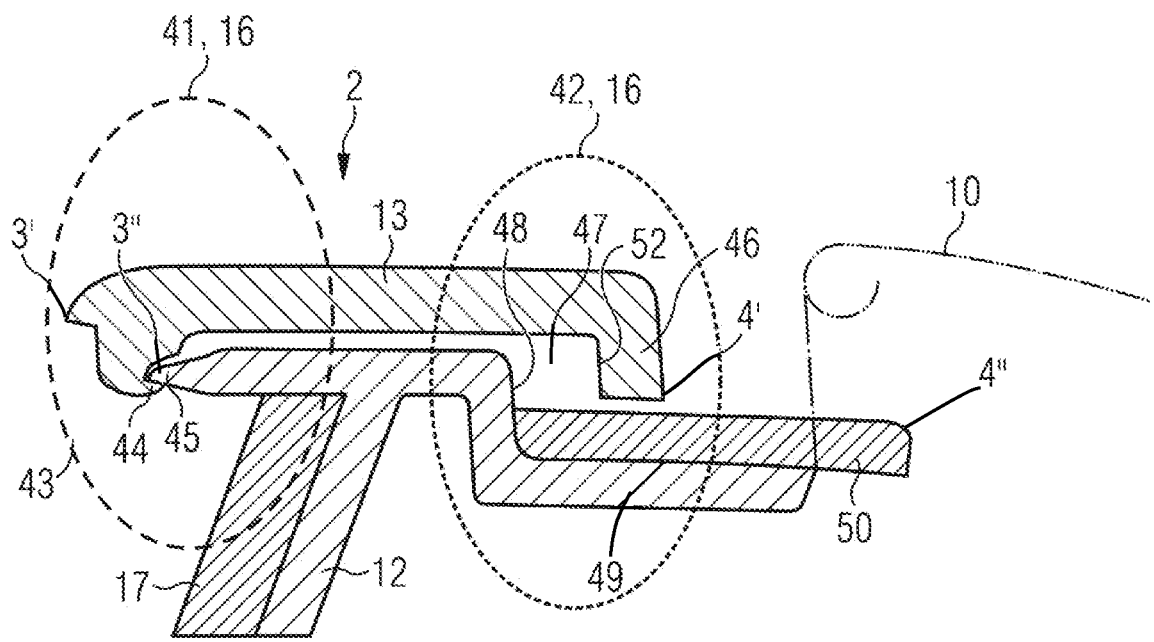
FIG. 14 is a sectional view of the vehicle strip device of FIG. 6 along direction D-D.

FIG. 14 shows a sectional view of the vehicle strip device 2 of FIG. 6 along direction D-D.

Here, the third fastening module 16 of the fastening strip element 12 and the shell element 13 is shown in FIG. 14. As previously explained, the third fastening module 16 is composed of a first fastening portion 41 on the first longitudinal side 3', 3" of the shell element 13 and of the fastening strip element 12, and a second fastening portion 42 on the second longitudinal side 4', 4" of the shell element 13 and of the fastening strip element 12.

The third fastening module 16 is located here, for example, in the region of the second longitudinal end 6 of the vehicle strip device 2, and thus in the direction of the engine hood 10 of the vehicle 1 of FIG. 1.

To provide the second fastening portion 42 of shell element 13 and fastening strip element 12, the shell element 13 has a downwardly extending positioning projection 46 on its second longitudinal side 4' on its underside for positioning the shell element 13 on the fastening strip element 12. In the exemplary embodiment shown in FIG. 14, this positioning projection 46 does not abut against the outer edge 48 of the fastening strip element 12 on its second longitudinal side 4". Instead, a gap 47 is arranged between the outer edge 48 of the fastening strip element 12 on its second longitudinal side 4" and the opposing inner edge 52 of the positioning projection 46 of the shell element 13. This gap 47 has the advantage that, if necessary, manufacturing and assembly tolerances may be compensated. In principle, however, a gap does not have to be provided.

In order to provide the first fastening portion 41 of shell element 13 and fastening strip element 12, the shell element 13 has a projection 43 having an undercut 44, for example in the form of a hook-shaped section. The hook-shaped portion is configured and extends downwardly away from the underside of the shell element 13 so as to engage around a clamping portion 45 of the fastening strip element 12 at the first longitudinal side 3" thereof, or to hook in the clamping portion 45 at the first longitudinal side 3".

As shown in FIG. 14, the first functional section, in this case the water deflector section 17, extends along the first longitudinal side 3" of the fastening strip element 12, i.e. along the windshield 8 in the assembled state, as far as the second longitudinal end 6" and thus as far as the region of the engine hood 10. The fastening strip element 12 comprises a third functional section on the second longitudinal side 4" thereof and in the region of the second longitudinal end 6". This third functional section is formed as a transition from the vehicle strip device 2 to the engine hood and water reservoir cover 10 of the vehicle 1, as is shown, for example, in FIG. 1. The fastening strip element 12 is formed on its second longitudinal side 4" and in the region of its second longitudinal end 6", in the exemplary embodiment shown in FIG. 14, having a stepped portion 49, on the upper side of which the third functional section is formed, for example, in the form of a lip, in particular a rubber lip, made at least of one elastomer as a plastic material, for example. The lip 50 and in particular rubber lip is formed as a transition of the vehicle strip device 2 to the engine hood 10 of the vehicle shown in FIG. 1.

Figure 15:
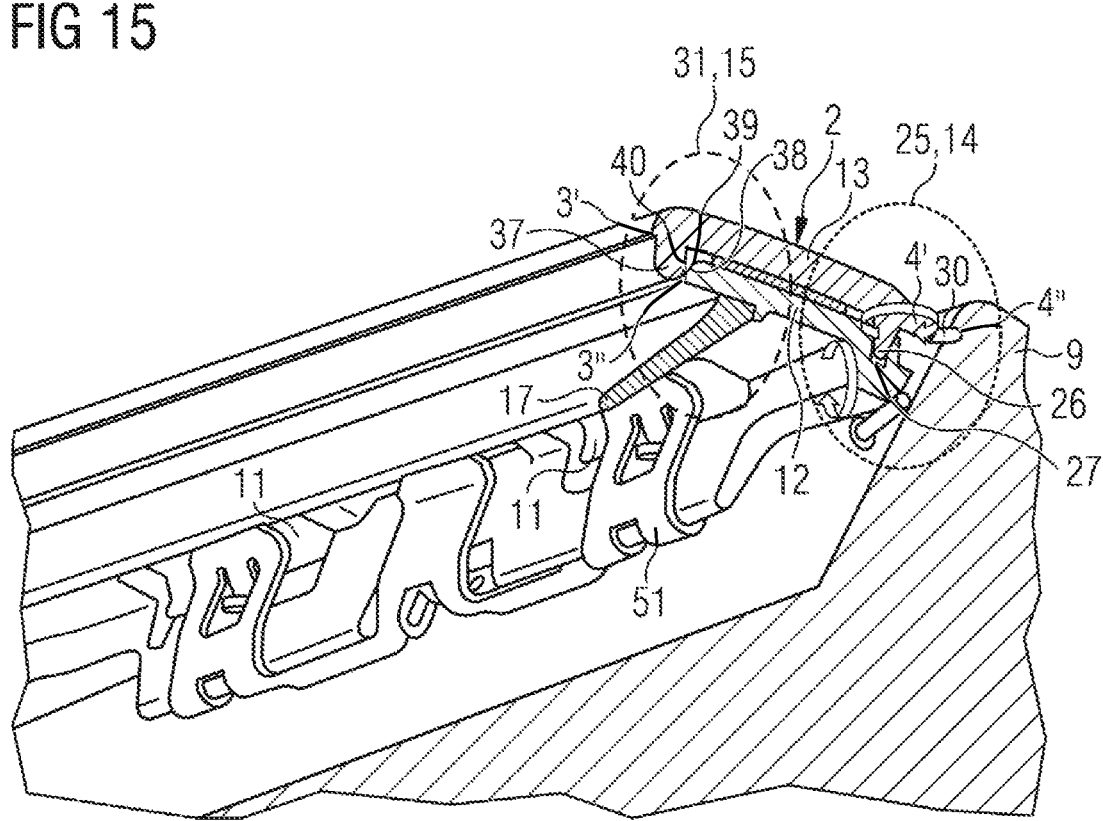
FIG. 15 is a perspective sectional view of the vehicle strip device, with the vehicle strip device being attached to the vehicle sidewall by means of metal clips.

FIG. 15 shows a perspective view of a section of the vehicle strip device 2 attached to the vehicle side wall 9 in the vicinity of the area of the section along the direction B-B, shown previously in FIGS. 7 and 11. Thereby, the vehicle body and in particular the side wall 9 and more precisely a part of the A-pillar of the vehicle 1 of FIG. 1 is shown. Furthermore, the vehicle strip device 2 is shown with its fastening strip element 12 and the shell element 13 fastened thereto.

Further, a part of the first fastening module 14 and the second fastening module 15 of the fastening strip element 12 and the shell element 13 are also shown, respectively.

FIG. 15 shows in more detail the second fastening portion 25 of the first fastening module 14. Here, the shell element 13 has the projection 26 on its second longitudinal side 4', 4" on the underside, which in turn is received and clamped in the corresponding receptacle 27 on the second longitudinal side 4" of the fastening strip element 12 by means of the first fastening portion 24 of the first fastening module 14.

Furthermore, in the region shown in FIG. 15, the first fastening portion 31 of the second fastening module 15 is shown, as previously explained with reference to FIGS. 12 and 13. In the first fastening portion 31 of the second fastening module 15, the shell element 13 has on the first longitudinal side 3' thereof the downwardly extending positioning projection 37 for positioning the shell element 13 on the fastening strip element 12. In the exemplary embodiment shown in FIG. 15 and previously in FIGS. 12 and 13, this positioning projection 37 does not abut against the outer edge 38 of the fastening strip element 12 on its first longitudinal side 3". Instead, the gap 39 is arranged between the outer edge 38 of the fastening strip element 12 on its first longitudinal side 3″ and the opposing inner edge 40 of the positioning projection 37 of the shell element 13.

As may be seen in FIG. 15, the respective first and second fastening portions 24, 25; 31, 32; 41, 42 of a fastening module 14, 15, 16 may be arranged opposing or offset from each other in the longitudinal direction of the vehicle strip device 2. In the case of a mutually offset arrangement of the first and second fastening portions 24, 25; 31, 32; 41, 42 of a fastening module 14, 15, 16, the two first and two fastening portions 24, 25; 31, 32; 41, 42 may be arranged overlapping one another or offset with respect to one another—without overlapping one another—in the longitudinal direction of the vehicle strip device 2.

In this context, as shown in the example in FIG. 15, a first and second fastening portion 31, 25 of two different fastening modules 14, 15 may additionally overlap with one another at least partially in the longitudinal direction of the vehicle strip device 2. In this way, the first and second fastening portions 24, 25; 31, 32; 41, 42 of the first, second and/or third fastening module 14, 15, 16 along the longitudinal direction of the vehicle strip device 2 and the shell element 13 and fastening strip element 12 thereof may be combined with each other as desired.

FIG. 15, however, also shows the connection of the vehicle strip device 2 according to the invention to the vehicle body, and in this case the side wall 9 and in particular A-pillar of the vehicle 1 of FIG. 1.

To this end, the fastening strip element 12 has, for example, along its second longitudinal side 3″, at least one or more openings 11 and/or recesses (not shown), e.g. paired openings 11, as shown in FIG. 15 and also in FIG. 2, for fastening clamping devices 51 in the respective opening 11 or recess (not shown) of the fastening strip element 12. Furthermore, the clamping devices 51 are configured to be fastened to the vehicle body, e.g. to side wall 9.

By means of the clamping devices 51, in this case for example the metal clips shown in FIG. 15, the vehicle strip device 2 may be fastened to the side wall 9 or another body part and in particular body panel, depending on the function and intended use.

However, the invention is not limited to this particular form of attachment of the vehicle strip device according to the invention to a vehicle body. Any other fastening device or combination of fastening devices suitable for securing the vehicle strip device to the vehicle body may be provided.

Although the present invention has been fully described above with reference to preferred embodiments, the invention is not limited thereto, but may be modified in a variety of ways. The embodiments described above may be combined with each other, in particular individual features thereof may be combined with each other.

LIST OF REFERENCE SIGNS

1 Vehicle
2 Vehicle strip device
3 First longitudinal side (windshield)
4 Second longitudinal end (side wall)
5 First longitudinal end (roof strip)
6 Second longitudinal end (engine hood)
7 Roof strip
8 Windshield
9 Side wall
10 Engine hood and water reservoir cover
11 Opening (for metal clips)
12 Fastening strip element
13 Shell element
14 First fastening module
15 Second fastening module
16 Third fastening module
17 Water deflector section (first functional section)
18 Connecting portion
19 End cap portion
20 Receptacle (cross section A-A)
21 Opening
22 Projection
23 Recess
24 First fastening portion (on first longitudinal side)
25 Second fastening portion (on second longitudinal side)
26 Projection
27 Receptacle
28 Undercut
29 Clamping section
30 Lip (second functional section)
31 First fastening portion (on first longitudinal side)
32 Second fastening portion (on second longitudinal side)
33 Receptacle
34 Opening
35 Latching element
36 Undercut (opening)
37 Positioning projection
38 Outer edge
39 Gap
40 Inner edge (projection)
41 First fastening portion
42 Second fastening portion
43 Projection
44 Undercut
45 Clamping section
46 Positioning projection
47 Gap
48 Outer edge (fastening strip element)
49 Stepped portion
50 Lip (third functional section)
51 Clamp element
52 Inner edge (shell element)

What I claim is:

1. A vehicle strip device, wherein the vehicle strip device comprises a shell element and a fastening strip element configured to have at least one fastening module and which are fastened to one another by means of the at least one fastening module, wherein the shell element and the fastening strip element are each formed as a plastic injection-moulded part made from at least one plastic material,
wherein the shell element and the fastening strip element are formed to have a first fastening module,
wherein the first fastening module is composed of a first fastening portion on a first longitudinal side of the shell element and the fastening strip element and a second fastening portion on a second, opposing longitudinal side of the shell element and the fastening strip element,
wherein the first fastening portion is formed to have a projection and an undercut of the shell element and a clamping section of the fastening strip element, wherein the clamping section is engaged the undercut or is embraced by the undercut in the assembled state of the vehicle strip device, and
wherein the second fastening portion is formed to have a projection on an underside of the shell element and a receptacle of the fastening element corresponding to the projection, for receiving or additionally clamping the projection in the assembled state of the vehicle strip device.

2. The vehicle strip device of claim 1,
wherein the shell element and the fastening strip element are fastened to one another by latching, clamping and pushing together by the at least one fastening module.

3. The vehicle strip device of claim 1,
wherein the fastening strip element is formed to have at least one of:
   a functional section,
   a water deflector section,
   a lip,
   a sealing lip;
   a rubber lip.

4. The vehicle strip device of claim 1,
wherein the fastening strip element is formed to have a connecting portion, wherein the connecting portion is an end cap portion for connecting the vehicle strip device to a further vehicle strip or to a roof strip.

5. The vehicle strip device of claim 1,
wherein the fastening strip element has a receptacle for receiving a longitudinal end of the shell element and for positioning the shell element with respect to the fastening strip element.

6. The vehicle strip device of claim 5,
wherein the receptacle has an opening and the longitudinal end of the shell element has a projection, wherein the projection is receivable in the opening for receiving the longitudinal end of the shell element and for positioning the shell element relative to the fastening strip element,
wherein the projection is additionally clampable or latchable in the opening for fastening the shell element and the fastening strip element to each other.

7. The vehicle strip device of claim 1,
wherein the fastening module is composed of a first fastening portion on a first longitudinal side of the shell element and of the fastening strip element, and a second fastening portion on a second, opposing longitudinal side of the shell element and the fastening strip element.

8. The vehicle strip device of claim 7,
wherein the first fastening portion and the second fastening portion extend longitudinally along at least part of or over an entire length of the vehicle strip device.

9. The vehicle strip device of claim 7,
wherein the first and second fastening portions of the fastening module overlap completely or partially in a longitudinal direction of the vehicle strip device.

10. The vehicle strip device of claim 1,
wherein the shell element and the fastening strip element are formed to have a first fastening module,
wherein the first fastening module is composed of a first fastening portion on a first longitudinal side of the shell element and the fastening strip element and a second fastening portion on a second, opposing longitudinal side of the shell element and the fastening strip element,
wherein the first fastening portion is formed to have a projection and an undercut of the shell element and a clamping section of the fastening strip element, wherein the clamping section is engaged the undercut or is embraced by the undercut in an assembled state of the vehicle strip device, and
wherein the second fastening portion is formed to have a projection on the underside of the shell element and a receptacle of the fastening element corresponding to the projection, for receiving or additionally clamping the projection in the assembled state of the vehicle strip device.

11. The vehicle strip device of claim 1,
wherein the shell element and the fastening strip element are formed to have a second fastening module,
wherein the second fastening module is composed of a first fastening portion on a first longitudinal side of the shell element and the fastening strip element, and a second fastening portion on a second, opposing longitudinal side of the shell element and the fastening strip element,
wherein the first fastening portion is formed to have a positioning projection on the underside of the shell element and an associated region of the outer edge of the fastening strip element for positioning the shell element with the positioning projection relative to the fastening strip element in the assembled state of the vehicle strip device, and
wherein the second fastening portion is formed to have a latching element on the underside of the shell element and a receptacle of the fastening strip element corresponding to the latching element, for receiving and latching the latching element in the assembled state of the vehicle strip device.

12. The vehicle strip device of claim 11,
wherein a gap is provided between the outer edge of the fastening strip element and the opposing inner edge of the projection of the shell element, and
wherein the receptacle has an opening for latching the latching element.

13. The vehicle strip device of claim 1,
wherein the shell element and the fastening strip element are formed to have a third fastening module,
wherein the third fastening module is composed of a first fastening portion on a first longitudinal side of the shell element and the fastening strip element, and a second fastening portion on a second, opposing longitudinal side of the shell element and the fastening strip element,
wherein the first fastening portion is formed to have a projection comprising an undercut of the shell element and a clamping section of the fastening strip element, wherein the clamping section is engaged or embraced by the projection comprising the undercut in the assembled state of the vehicle strip device, and
wherein the second fastening portion is formed to have a positioning projection on the underside of the shell element and a region of the outer edge of the fastening strip element associated to the positioning projection, for positioning the shell element with the positioning projection relative to the fastening strip element in the assembled state of the vehicle strip device, wherein the associated region of the outer edge selectively and additionally has a stepped portion on the upper side of which a functional section is formed, opposing the shell element.

14. The vehicle strip device of claim 1,
wherein the first and second fastening portions of at least one fastening module are provided opposing one another on the longitudinal sides of the shell element and of the fastening strip element, thereby the first and second fastening portions overlap one another at least partially or completely.

15. The vehicle strip device of claim 1,
wherein the fastening strip device is configured to have at least one receptacle or an opening for receiving and fastening a clamping device, wherein the clamping device is configured in such a way to connect the vehicle strip device to an associated vehicle or to the vehicle body thereof and to attach the vehicle strip device to the vehicle and the vehicle body, respectively.

16. The vehicle strip device of claim 1,
wherein at least one of the shell element and fastening strip element is configured to be a single-component injection-moulded part or multi-component injection-moulded part.

17. The vehicle strip device of claim 1,
wherein the vehicle strip device is a functional strip or a trim strip on a motor vehicle.

18. A vehicle strip device, wherein the vehicle strip device comprises a shell element and a fastening strip element configured to have at least one fastening module and which are fastened to one another by means of the at least one fastening module,
wherein the shell element and the fastening strip element are each formed as a plastic injection-moulded part made from at least one plastic material,
wherein the shell element and the fastening strip element are formed to have a second fastening module,
wherein the second fastening module is composed of a first fastening portion on a first longitudinal side of the shell element and the fastening strip element, and a second fastening portion on a second, opposing longitudinal side of the shell element and the fastening strip element,
wherein the first fastening portion is formed to have a positioning projection on an underside of the shell element and an associated region of the outer edge of the fastening strip element for positioning the shell element with the positioning projection relative to the fastening strip element in an assembled state of the vehicle strip device, and
wherein the second fastening portion is formed to have a latching element on the underside of the shell element and a receptacle of the fastening strip element corresponding to the latching element, for receiving and latching the latching element in the assembled state of the vehicle strip device.

19. A vehicle strip device, wherein the vehicle strip device comprises a shell element and a fastening strip element configured to have at least one fastening module and which are fastened to one another by means of the at least one fastening module,
wherein the shell element and the fastening strip element are each formed as a plastic injection-moulded part made from at least one plastic material,
wherein the shell element and the fastening strip element are formed to have a third fastening module,
wherein the third fastening module is composed of a first fastening portion on a first longitudinal side of the shell element and the fastening strip element, and a second fastening portion on a second, opposing longitudinal side of the shell element and the fastening strip element,
wherein the first fastening portion is formed to have a projection comprising an undercut of the shell element and a clamping section of the fastening strip element, wherein the clamping section is engaged or embraced by the projection comprising the undercut in the assembled state of the vehicle strip device, and
wherein the second fastening portion is formed to have a positioning projection on an underside of the shell element and a region of the outer edge of the fastening strip element associated to the positioning projection, for positioning the shell element with the positioning projection relative to the fastening strip element in the assembled state of the vehicle strip device, wherein the associated region of the outer edge selectively and additionally has a stepped portion on the upper side of which a functional section is formed, opposing the shell element.

* * * * *